United States Patent [19]

Dotson et al.

[11] Patent Number: 4,474,408

[45] Date of Patent: Oct. 2, 1984

[54] METHOD FOR REMOVING AMMONIUM IONS FROM A SUBTERRANEAN FORMATION

[75] Inventors: Billy J. Dotson, Grand Prairie, Tex.; Tsoung-Yuan Yan, Philadelphia, Pa.

[73] Assignee: Mobil Oil Corporation, New York, N.Y.

[21] Appl. No.: 407,202

[22] Filed: Aug. 11, 1982

[51] Int. Cl.$^3$ .................. E21B 43/28; E21B 47/00
[52] U.S. Cl. ............................... 299/4; 166/252; 166/270; 405/263
[58] Field of Search ........... 166/252, 270, 271, 305 R, 166/307; 299/4, 5; 405/263

[56] References Cited

U.S. PATENT DOCUMENTS

| | | | |
|---|---|---|---|
| 4,079,783 | 3/1978 | Snavely et al. | 166/252 |
| 4,114,693 | 9/1978 | Foster et al. | 166/305 R |
| 4,134,618 | 1/1979 | Kossack | 299/4 X |
| 4,162,707 | 7/1979 | Yan | 166/252 |
| 4,234,231 | 11/1980 | Yan | 299/4 |
| 4,300,860 | 11/1981 | Yan | 405/263 |
| 4,314,779 | 2/1982 | Sundar et al. | 299/4 X |
| 4,372,616 | 2/1983 | Paul et al. | 299/5 |

OTHER PUBLICATIONS

"Removal of Ammonium Ions from Subterranean Formations by Flushing with Lime Saturated Brines"; SME-AIME Annual Meeting; Dallas, Texas; Feb. 14–18, 1982; Yan and Espenscheid.

Primary Examiner—George A. Suchfield
Attorney, Agent, or Firm—Alexander J. McKillop; Michael G. Gilman; Charles A. Malone

[57] ABSTRACT

The ammonium ions in a subterranean clay-containing formation may be removed by flushing the formation with a calcium ion containing restoration fluid having substantially the highest pH effective to prevent precipitation of calcium hydroxide from said restoration fluid. The calcium ion concentration in the restoration fluid is maintained between about 10,000 and 100,000 ppm until the ammonia concentration in the produced fluid peaks or is less than about 100 ppm. Thereafter the calcium ion concentration is maintained at about 400 to about 600 ppm until the desired level of ammonia is obtained, usually about 1–3 ppm.

16 Claims, 1 Drawing Figure

METHOD FOR REMOVING AMMONIUM IONS FROM A SUBTERRANEAN FORMATION

BACKGROUND OF THE INVENTION

1. Field of the Invention

The present invention relates to a method for restoring a subterranean formation which may have become contaminated during an in situ leach operation and more particularly relates to a method of removing contaminants, i.e., ammonium ions, from a subterranean claycontaining formation after an in situ leach operation to restore the purity of any ground waters that may be present in the formation.

2. Description of the Prior Art

In a typical in situ leach operation, wells are completed into a mineral or metal value bearing (e.g., uranium) formation and a lixiviant is flowed between wells to dissolve the desired values into the lixiviant. The pregnant lixiviant is produced to the surface where it is treated to recover the desired values from the lixiviant. Unfortunately, many known, highly effective lixiviants not only leach the desired values from the formation but, also, react with certain formations to give up chemical substances which remain in the formation after the lixiviants pass therethrough. Where the formation also contains ground waters and/or a water source which would otherwise be fit for human and/or animal consumption, these chemical substances will likely to create a substantial contamination problem for this water. If this be the case, the formation must be treated after a leach operation to remove these contaminants to restore the purity of the water.

One method for improving the purity of a contaminated water source is to merely pump the water from the formation until the contaminant reaches an acceptably low level. Another, simple method is to pump uncontaminated water through the formation to flush out the contaminants. These methods work well where the contaminants are soluble and are not exchanged by some component of the formation from which it can only be released at a very slow rate. If the contaminants are exchanged by the formation, extremely large volumes of water must be used to adequately restore the formation.

In many known uranium and related value bearing formations, a substantial part of the formation matrix is comprised of calcium-based clays (e.g., smectite). This type formation presents a real formation water contamination problem when a known, highly effective lixiviant comprised of an aqueous solution of ammonium carbonate and/or bicarbonate is used to leach the desired values from the formation. Here, the ammonium ions from the lixiviant are exchanged into the smectite clays in the formation which make their removal by flushing with ground water a very slow and extended process.

One method for removing ammonium ions from a formation following a uranium leach operation is disclosed in U.S. Pat. Nos. 4,079,783 of Snavely et al. and 4,114,693 of Foster et al., wherein a restoration fluid comprising an aqueous solution of a strong, soluble, alkaline compound is flowed through the formation to convert ammonium ions to an un-ionized form, i.e., ammonia ($NH_3$), which, in turn, can easily be flushed from the formation. However, while this approach achieves a good result, it requires a substantial amount of alkaline compound, e.g., lime or sodium hydroxide, and produces a large quantity of waste water containing calcium and ammonia which has to be properly disposed of at the surface.

Furthermore, the ion exchange between the ammonium ions and the cations in the aqueous alkaline solution takes place accordng to the mass action law. Consequently, the rate of ammonium ion removal becomes slower and slower as more and more of the ammonium ions are removed. This makes the last or residual ammonium ions very difficult to remove. In order to meet certain governmental requirements (e.g., Texas is contemplating no more than 3 parts per million level of ammonia in the formation water), it has been estimated that approximately 99.5 percent of the ammonium ions in a contaminated clay formation has to be exchanged by cations from the restoration fluid. This obviously requires a considerable amount of alkaline solution to be handled to restore the formation to the required specifications. Also, the ammonia content of the recovered restoration fluid requires this fluid to be treated to remove the ammonia before the fluid can be used to make up fresh restoration fluid for recycle or before it can otherwise be disposed of.

U.S. Pat. Nos. 4,162,707 and 4,300,860 of Yan disclose another method for removing ammonium ions from a formation which has undergone an in situ uranium leaching operation. The formation is flushed with a halogenated restoration fluid containing, for example, chlorinated water or a hydrochlorite solution which reacts with the ammonia to decompose it to nitrogen.

Yan and Espenscheid presented a paper entitled "Removal of Ammonium Ions from Subterranean Formations by Flushing with Lime Saturated Brines" at the SME-AIME Annual Meeting, Dallas, Tex., Jan. 14-18, 1982. The procedure employed involved the use of a restoration fluid containing 1 g/l NaCl to simulate the background salt of the connate water which was saturated with lime to provide an average of 500 ppm Ca. The restoration fluid was pumped through a column of the leached formation. This lime saturated solution was effective in lowering the ammonia concentration in the effluent from over 500 ppm to 1.8 ppm. It took 24.5 pore volumes of the restoration fluid to reach an ammonia level of 3 ppm. Except for the initial period, the pH of the effluent was between 9.5 and 10.0 until the ammonium ion concentration to the effluent began to drop, at which point th pH increased sharply. The strong buffering action of the $NH_4^+/NH_4OH$ system is suggested as an explanation of this effect.

A commonly assigned and copending patent application (Ser. No. 221,728, now U.S. Pat. No. 4,372,616, filed Dec. 31, 1980) discloses another method for removing ammonium ions from a leached uranium formation by employing a restoration fluid comprising carbonic acid. The carbonic acid dissolves calcite in the formation producing a high calcium ion concentration buildup during circulation of the restoration fluid. The calcium ion exchanges with the ammonium ion bound in the clay lattice, thereby removing the troublesome ion from the formation.

It is an object of this invention to remove the ammonium ions from a leached uranium subterranean formation.

It is another object of this invention to reduce the ammonium ion concentration in a leached uranium subterranean formation to an environmentally acceptable level.

It is a further object of this invention to remove the ammonium ions from a leached uranium subterranean formation by means of a calcium ion exchange technique which is accomplished in less time and with lower chemical requirements and/or less volume of restoration fluid than required in prior art calcium ion exchange ammonium leaching procedures.

The achievement of these and other objects will be apparent from the following description of the subject invention.

SUMMARY OF THE INVENTION

In accordance with the subject invention, it has been found that significant improvements in the process of removing ammonium ions from a leached uranium formation by calcium ion exchange are achieved by the use of calcium salts, such as $CaCl_2$, as the source of calcium ions in the restoration fluid, initially at a concentration of between about 10,000 and about 100,000 ppm $Ca^{++}$ and at substantially the highest pH effective to prevent precipitation of $Ca(OH)_2$ until the ammonium concentration in the production fluid has passed a peak or is lower than about 100 ppm, and then at a concentration of about 400 to about 600 ppm $Ca^{++}$ and at substantially the highest pH effective to prevent precipitation of $Ca(OH)_2$ until the desired ammonium concentration, e.g. 1–3 ppm $NH_3$, is obtained in the production fluid. By treating a uranium leached formation in accordance with the process of this invention the formation will be quickly and completely restored to an ecologically acceptable solution.

In particular, this invention relates to a process of treating a subterranean clay-containing formation having ammonium ions absorbed on the clay which comprises:

(a) flushing said formation with a restoration fluid having a $Ca^{++}$ concentration of between about 10,000 and about 100,000 ppm and at substantially the highest pH effective to prevent precipitation of calcium hydroxide from said fluid whereby calcium ions are exchanged for ammonium ions in said formation until the ammonia concentration in the effluent from the formation peaks or is less than about 100 ppm, (b) adjusting the $Ca^{++}$ concentration is said restoration fluid to between about 400 and about 600 ppm and increasing and maintaining the pH in said restoration fluid to substantially the highest value effective to prevent precipitation of calcium hydroxide from said restoration fluid, and (c) continuing the flushing of said formation whereby calcium ions are exchanged for ammonium ions in said formation until the ammonia concentration in the effluent from the formation is less than about 10 ppm.

This invention may also be described as a process of restoring a subterranean clay-containing formation which has been leached with an ammonium solution, said formation having at least one injection well and at least one production well which comprises:

(a) injecting through said at least one injection well a restoration fluid having a $Ca^{++}$ concentration of between about 10,000 and about 100,000 ppm and at substantially the highest pH effective to prevent precipitation of calcium hydroxide from said restoration fluid, (b) flowing said restoration fluid through said formation to exchange calcium ions for ammonium ions in said formation, (c) producing fluids from said formation through said at least one production well, (d) monitoring the ammonia concentration in said produced fluids until said ammonia concentration peaks or is less than about 100 ppm, (e) adjusting the $Ca^{++}$ concentration in said restoration fluid to between about 400 and about 600 ppm and increasing and maintaining the pH in said restoration fluid to substantially the highest value effective to prevent reciprocation of calcium hydroxide from said restoration fluid, and (f) continuing the injection of said restoration fluid, the production of fluids from said formation and the monitoring of said ammonia concentration until said ammonia concentration is less than about 10 ppm.

In an optional embodiment, the formation may be flushed with 1 to 2 pore volumes of water prior to the treatment with the calcium ion restoration fluid. In another embodiment performed subsequent to the exchange of the ammonium ions in the formation, the pH of the formation is adjusted to its former value by flushing with an acidic restoration fluid.

DESCRIPTION OF THE PREFERRED EMBODIMENTS

Figure 1:
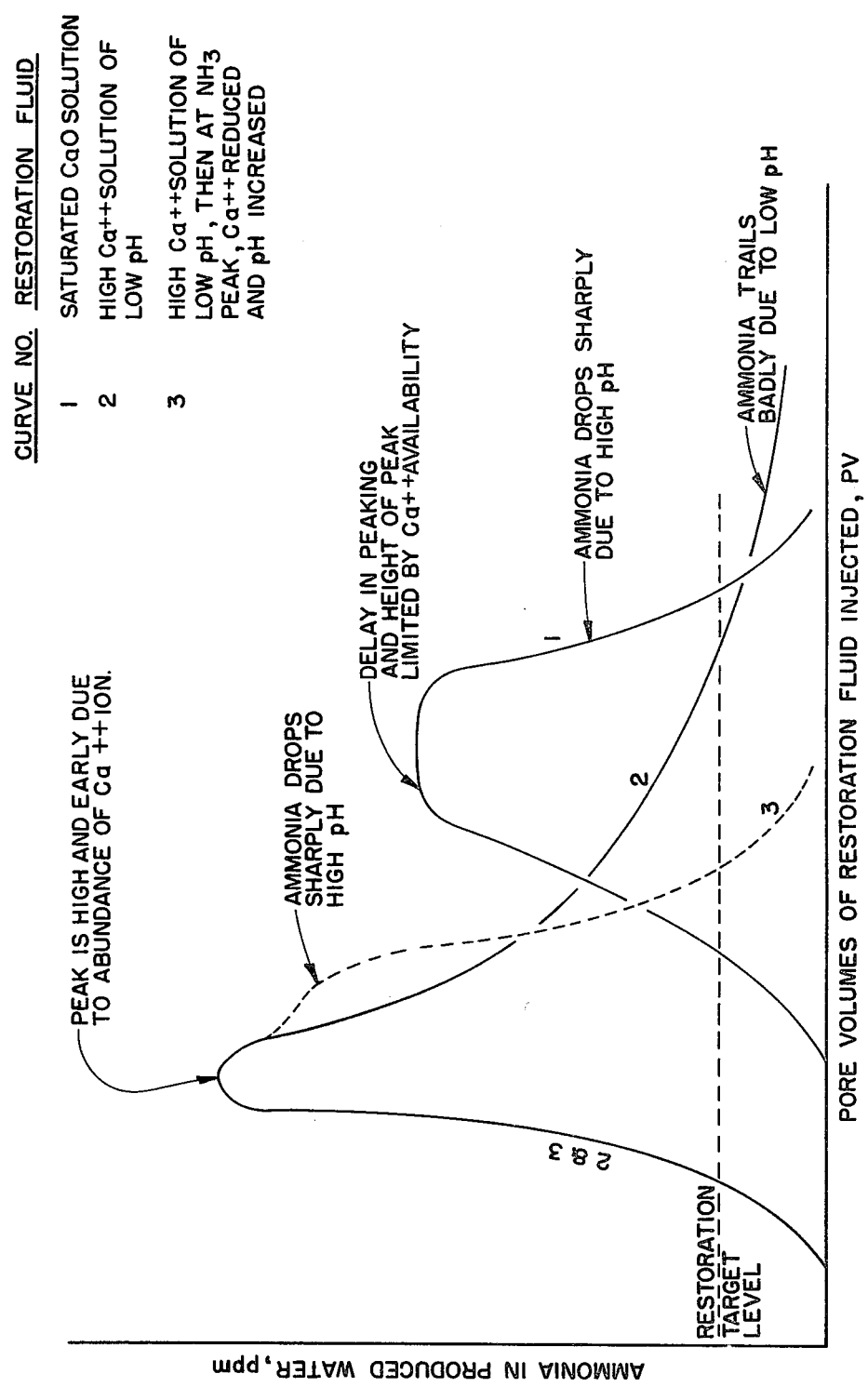
FIG. 1 is a schematic graph showing the relationship of ammonia concentration in the produced fluid versus the pore volumes of various restoration fluids injected.

In a typical in situ leach operation for recovering uranium and/or related values, wells are completed into a uranium or other value bearing formation and a lixiviant is flowed between the wells. The uranium and/or related values are dissolved into the lixiviant and are produced therewith to the surface where the pregnant lixiviant is treated to recover the desired values.

In many known formations where an in situ leach such as mentioned above is carried out, a substantial part of the formation matrix is comprised of calcium-based clays (e.g., smectite). When a desired, highly effective lixiviant, i.e., ammonium carbonate and/or bicarbonate, is used in the leach operation, ammonium ions ($NH_4^+$) are exchanged into and strongly held by the clays and remain in the formation after the leach operation is completed. These ammonium ions slowly dissolve into any ground water that may be present in the formation and thereby pose a contamination threat to the water source.

Clays are complex compounds comprised of calcium, magnesium, aluminum, silicon, and oxygen. They are capable of exchanging calcium ions for other ions in much the same way as do commercial ion exchange resins used for softening water. This property of clays is illustrated by the equation:

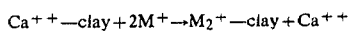

where $M^+$ is another cation.

The ammonium ion ($NH_4^+$) is strongly exchanged by clays so that $NH_4^+$ is bound into the clay lattice:

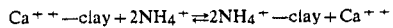

The clay and aqueous solution constituting its environment are in equilibrium, i.e., reaction (2) is reversible. If $NH_4^+$ in the solutions, e,g., formation water is decreased, $NH_4^+$ will come off the clay and the cations in the water, such as calcium ion ($Ca^{++}$), will go back on. However, the clay-$NH_4^+$ equilibrium is such that only a very small amount of $NH_4^+$ in solution will maintain a large amount of $NH_4^+$ on the clay, i.e., the clay prefers $NH_4^+$ to $Ca^{++}$. This is the reason that $NH_4^+$ is only very slowly released by flushing the clay with water containing only neutral, dissolved salts.

In accordance with the present invention, the contaminated space (a "pore volume") of the formation is treated with a restoration fluid containing calcium ions at a controlled concentration and with an alkaline pH level which effectively prevents precipitation of calcium hydroxide. The calcium ions are exchanged for the ammonium ions which in turn are converted to ammonia and removed from the formation in the produced fluid. The restoration fluid is injected into one of the wells previously used in the leach operation and fluids are produced from another until the ammonia concentration in the produced fluids reaches an acceptable level. After treatment to remove the ammonia, the produced fluids may be made up with additional calcium salts and recycled as fresh restoration fluid. When the ammonia content of the produced fluids drops below an ecologically satisfactory level, e.g., 3 parts per million indicating that substantially all of the ammonium ions have been removed from the formation, injection of the restoration fluid is stopped and the restoration of the formation is complete.

As stated above, there are equilibria existing between $NH_4^+$ in the clay and $NH_4^+$ in the formation water, see Equation (2), and also between $NH_3$ and $NH_4^+$ in the formation water, the latter being:

$$NH_4^+ + OH^- \rightleftharpoons NH_3 + H_2O \qquad (3)$$

The restoration process can be described by reference to equations (2) and (3). The ion exchange of equation (2) can be pushed to the left by use of excess amount of $Ca^{++}$, i.e., mass action. With the $NH_4^+$ displaced to the restoration fluid, the alkaline pH condition of the fluid will convert the $NH_4^+$ to $NH_3$ in accordance with equation (3) to break up the equilibrium and cause eventual removal of $NH_3$ from the formation. In this fashion the reversible ion exchange between $NH_4^+$ and clay can be stopped so that the overall reaction becomes:

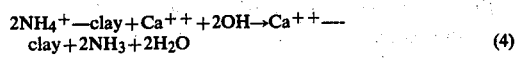

$$2NH_4^+-clay + Ca^{++} + 2OH^- \rightarrow Ca^{++}-clay + 2NH_3 + 2H_2O \qquad (4)$$

FIG. 1 is a schematic representation of the relationship between the ammonia concentration in the produced water and the pore volumes of various restoration fluids including those for practicing the present invention. Curve 1 depicts the results for a saturated lime solution. With this restoration fluid the rate of restoration is limited by the availability of $Ca^{++}$ ion, resulting in the use of excess volume of restoration fluid, particularly during the early stage of a restoration operation. Further, the limited availability of $Ca^{++}$ ion, also delays the peaking of the ammonia concentration as well as limiting the height of the peak. Curve 2 depicts the results for a high concentration $CaCl_2$ solution of relatively low pH (but sufficiently high to prevent Ca(OH)$_2$ precipitation). The early stage of this restoration operation is effective and rapid as is evident from the early peaking of the ammonia concentration and at a significantly high level. However, the ammonia levels trail off badly in the latter stages due to the low pH which causes an unfavorable equilibrium between $NH_4^+$ and $NH_3$ as is evident from equation (3). The rate of removal becomes painfully slow during this stage. Curve 3 depicts a restoration operation conducted in accordance with the present invention. The fluid employed in the initial stages is essentially the same as that of Curve 2, high $Ca^{++}$ ion concentration, e.g. 10,000 to 100,000 ppm, and a low pH but high enough to prevent Ca(OH)$_2$ precipitation. Thus, Curve 2 and Curve 3 coincide with the ammonia concentration peaking early and at a high concentration. Once the peak is reached, however, the $Ca^{++}$ ion level is decreased to between 400 and 600 ppm and the pH is increased to a higher value but not so high as to cause Ca(OH)$_2$ precipitation. The results are dramatic. The target level of ammonia is obtained with substantially fewer pore volumes than in the other two operations.

The practice of this invention results in an improvement in the efficiency of a restoration operation for ammonia removal. This process permits a high rate of ammonium ion removal from the formation using less restoration fluid and in less operation time than other calcium ion exchange procedures.

The restoration fluid employed in an aqueous solution of a controlled $Ca^{++}$ concentration and a controlled pH. The water employed may be from a variety of available sources but ideally it can be either fresh formation water or recycled production water. Calcium salts, preferably $CaCl_2$, are added to provide the required concentration of $Ca^{++}$ and the pH is adjusted to prevent Ca(OH)$_2$ precipitation utilizing available alkaline materials, such as NaOH or Ca(OH)$_2$. The calcium ion concentration is adjusted during the restoration operation. Initially its $Ca^{++}$ level should exceed 1,000 ppm, preferably between about 10,000 and about 100,000 ppm. When the ammonia concentration in the produced fluid has peaked or is less than about 100 ppm, the $Ca^{++}$ concentration should be adjusted to between about 400 and about 600 ppm. The pH of the restoration fluid at all times must be at substantially the highest value effective to prevent the precipitation of Ca(OH)$_2$ from the restoration fluid. The adjustment of the $Ca^{++}$ concentration and the pH can be done continuously or in a multi-step operation. In general, the higher the $Ca^{++}$ concentration, the lower the pH has to be to achieve the desired results. For example, at a $Ca^{++}$ concentration of 500 ppm, the pH should be less than 12.5. At the 10,000 ppm $Ca^{++}$ level, the pH required should be below about 11.5.

The restoration fluid is injected into the formation through at least one injection well and flows through the formation to produce fluids through at least one production well. Initially, the $Ca^{++}$ concentration is between about 10,000 and about 100,000 ppm and the pH level is at substantially the highest level effective to prevent Ca(OH)$_2$ precipitation. As the fluid flows through the formation the $Ca^{++}$ ions are exchanged with the $NH_4^+$ ions bound in the clay lattice. The $OH^-$ ions in the restoration fluid convert the released ammonium ions to ammonia which is flushed from the formation by the produced fluids. The ammonia concentration of the produced fluid is monitored during the operation. When it peaks or drops to a level of less than about 100 ppm, the $Ca^{++}$ concentration in the restoration fluid is reduced to between about 400 and about 600 ppm and the pH is increased and maintained at the highest level effective to prevent Ca(OH)$_2$ precipitation. The restoration operation is continued until the ammonia concentration indicates that the ammonium ion concentration in the formation is at an ecologically acceptable level. A level of about 1 to about 3 ppm ammonia has been contemplated as desirable by some regulatory agencies.

The produced fluids may be recycled for reuse as the restoration fluid. When the ammonia level is significant it can be reduced by airstripping after increasing the pH. The production fluids can be passed through a packed or sieve plate tower while air is passed therethrough in countercurrent fashion to remove the ammonia.

In practicing the invention, it has been found that it is preferred to flush the formation with water, prior to the restoration process to remove ammonium ions or ammonia in the interstitial water. One to two pore volumes of water, such as formation water, have been found satisfactory for this purpose.

Following the restoration of the formation to an acceptable ammonium ion concentration, the pH of the formation may be adjusted by passing an acidic treating solution through the formation. Useful acids include HCl, H$_2$SO$_4$ and CO$_2$. In this fashion, the pH of the formation may be restored to substantially the level it was prior to the in situ uranium leaching operation.

The following example illustrates the practice of this invention.

An experimental flow pack was prepared from clay-containing ore sand. This ore sand contained about 14% wt. water and had been obtained from a depth interval of 489–505 feet from well no. 75UI-52AC in the O'Hern field, located in South Texas subsequent to the uranium having been leached from the formation by an in situ operation employing an ammonium carbonate and/or bicarbonate solution. A ¾" ID×24" plastic tube was packed "wet" with about 250 grams of this ore sand by pouring the ore sand into the tube while a free water level was maintained above the level of the sand in the tube. The ends of the packed tube were covered with wire gauge and glass wool to retain the fines. The prepared ore sample has a permeability of about 250 millidarcys and a pore volume of about 80 cc.

To restore the ammonium ion containing ore sand, a CaCl$_2$ solution containing about 10,000 Ca$^{++}$ was injected into the flow pack at the rate of 1.0 PV/day. The solution had an alkaline pH effective to prevent Ca(OH)$_2$ precipitation. The effluent was monitored for ammonia concentration. Following a peak in the ammonia concentration, the pH of the restoration fluid was raised to approximately 12 by the addition of saturated CaO solution and the Ca$^{++}$ ion concentration was adjusted to about 500 ppm. Injection of this solution was continued until the ammonia concentration in the effluent was well below one ppm. This injection schedule was considered successful in that the ammonia concentration reached one ppm after 10.5 pore volumes of injection.

What is claimed is:

1. A process of treating a subterranean claycontaining formation having ammonium ions absorbed on the clay which comprises:
    (a) flushing said formation with a restoration fluid having a Ca$^{++}$ concentration of between about 10,000 and about 100,000 ppm and at substantially the highest pH effective to prevent precipitation of calcium hydroxide from said fluid whereby calcium ions are exchanged for ammonium ions in said formation until the ammonia concentration in the effluent from the formation peaks or is less than about 100 ppm,
    (b) adjusting the Ca$^{++}$ concentration in said restoration fluid to between about 400 and about 600 ppm and increasing and maintaining the pH in said restoration fluid to substantially the highest value effective to prevent precipitation of calcium hydroxide from said restoration fluid, and
    (c) continuing the flushing of said formation whereby calcium ions are exchanged for ammonium ions in said formation until the ammonia concentration in the effluent from the formation is less than about 10 ppm.

2. A process according to claim 1 wherein prior to step (a) the formation is flushed with about 1 to 2 pore volumes of water.

3. A processing according to claim 1 wherein subsequent to step (c) the formation is flushed with an acidic restoration fluid to restore the formation to substantially its pH prior to the placement of ammonium ions in said formation.

4. A process according to claim 3 wherein the acidic restoration fluid comprises HCl, H$_2$SO$_4$ or CO$_2$.

5. A process according to claim 1 wherein the pH in step (a) or (b) is adjusted with Ca(OH)$_2$ or NaOH.

6. A process according to claim 1 wherein the Ca$^{++}$ concentration in step (b) is reduced stepwise and the pH is correspondingly increased stepwise.

7. A process according to claim 1 wherein the restoration fluid comprises CaCl$_2$.

8. A process according to claim 1 wherein the ammonia concentration in step (c) is about 1 to about 3 ppm.

9. A process of restoring a subterranean clay-containing formation which has been leached with an ammonium solution, said formation having at least one injection well and at least one production well which comprises:
    (a) injecting through said at least one injection well a restoration fluid having a Ca$^{++}$ concentration of between about 10,000 and about 100,000 ppm and at substantially the highest pH effective to prevent precipitation of calcium hydroxide from said restoration fluid,
    (b) flowing said restoration fluid through said formation to exchange calcium ions for ammonium ions in said formation,
    (c) producing fluids from said formation through said at least one production well,
    (d) monitoring the ammonia concentration in said produced fluids until said ammonia concentration peaks or is less than about 100 ppm,
    (e) adjusting the Ca$^{++}$ concentration in said restoration fluid to between about 400 and about 600 ppm and increasing and maintaining the pH in said restoration fluid to substantially the highest value effective to prevent precipitation of calcium hydroxide from said restoration fluid, and
    (f) continuing the injection of said restoration fluid, the production of fluids from said formation and the monitoring of said ammonia concentration until said ammonia concentration is less than about 10 ppm.

10. A process according to claim 9 wherein prior to step (a), the formation is flushed with about 1 to 2 pores volumes of water.

11. A process according to claim 9 wherein subsequent to step (d) the formation is flushed with an acidic restoration fluid to restore the formation to substantially its pH prior to the ammonium solution leaching.

12. A process according to claim 11 wherein the acidic restoration fluids comprises HCl, $H_2SO_4$ or $CO_2$.

13. A process according to claim 9 wherein the pH in step (a) or (e) is adjusted with $Ca(OH)_2$ NaOH.

14. A process according to claim 9 wherein the $Ca^{++}$ concentration in step (e) is reduced stepwise and the pH is correspondingly increased stepwise.

15. A process according to claim 9 wherein the restoration fluid comprises $CaCl_2$.

16. A process according to claim 9 wherein the ammonia concentration in step (d) is about 1 to about 3 ppm.

* * * * *